United States Patent
Harold et al.

(10) Patent No.: US 7,434,230 B2
(45) Date of Patent: Oct. 7, 2008

(54) METHOD AND SYSTEM FOR TIME BOUNDING NOTIFICATION DELIVERY IN AN EVENT DRIVEN SYSTEM

(75) Inventors: Ward K. Harold, Austin, TX (US); Shawn William Lauzon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 11/002,700

(22) Filed: Dec. 2, 2004

(65) Prior Publication Data

US 2006/0123427 A1    Jun. 8, 2006

(51) Int. Cl.
G06F 3/00 (2006.01)
G06F 9/44 (2006.01)
G06F 9/46 (2006.01)
G06F 13/00 (2006.01)
G06F 11/00 (2006.01)

(52) U.S. Cl. .......................... 719/318; 714/48
(58) Field of Classification Search .......... 719/318; 714/48
See application file for complete search history.

(56) References Cited

U.S. PATENT DOCUMENTS

| | | | | |
|---|---|---|---|---|
| 5,305,454 A | * | 4/1994 | Record et al. | 719/318 |
| 5,530,868 A | * | 6/1996 | Record et al. | 719/318 |
| 5,727,148 A | * | 3/1998 | Takekawa | 709/206 |
| 6,725,281 B1 | * | 4/2004 | Zintel et al. | 719/318 |
| 7,080,385 B1 | * | 7/2006 | Collison et al. | 719/318 |
| 2002/0002633 A1 | * | 1/2002 | Colling, III | 709/318 |
| 2002/0165981 A1 | * | 11/2002 | Basturk et al. | 709/242 |
| 2004/0025171 A1 | * | 2/2004 | Barinov et al. | 719/318 |
| 2004/0193688 A1 | * | 9/2004 | McKee et al. | 709/206 |
| 2004/0194116 A1 | * | 9/2004 | McKee et al. | 719/318 |

* cited by examiner

*Primary Examiner*—Thomas Lee
*Assistant Examiner*—Qing-Yuan Wu
(74) *Attorney, Agent, or Firm*—Mark S. Walker; Suiter Swantz pc llo

(57) ABSTRACT

The present invention is directed to a method and system for preventing unnecessary delays during notification delivery process in an event driven system. The unnecessary delays may be caused by waiting for event completion acknowledgments for an unbounded time. Notifications (event handle requests) may be dispatched to all interested parties in parallel. Then, handling acknowledgments from the interested parties may be gathered after a specific delay. Termination requests may be sent to non-responding parties in order to prevent indefinite waiting or an advertent notification cycle. Alternatively, non-responding parties may be removed from a list of listeners which have been registered as interesting parties for a software component in the event driven system.

8 Claims, 5 Drawing Sheets

METHOD AND SYSTEM FOR TIME BOUNDING NOTIFICATION DELIVERY IN AN EVENT DRIVEN SYSTEM

FIELD OF THE INVENTION

The present invention generally relates to the field of event driven systems, and particularly to a method of handling notifications in an event driven system.

BACKGROUND OF THE INVENTION

Event driven architecture is an emerging software infrastructure designed to support a real-time method of integrating application processes. Many software developers have favored the event driven architecture to construct highly dynamic, adaptive and extensible systems. In event driven architecture, events are largely defined by their meaning to the business and granularity. Events may occur throughout existing applications. For example, a database update may be a meaningful event for some business while the successful completion of an order process may be an event for other business. A key aspect of the event driven architecture may be a notification delivery.

In many event driven systems, software components that send notifications need to know that each notification they send has been handled by all interested parties (other applications) before further proceeding. As a result, the software component may not perform further operations while it is waiting for dispatched notifications to be handled by interested parties. Sometimes, an advertent "notification cycle" may be created when the notification is sent to the software component which is also a listener of other software components. In order for an event driven system to make progress without unnecessary delays, an advertent "notification cycle" must be avoided and the software component must not block for an unbound length of time waiting for a notification to be handled by all interested parties.

Therefore, it would be desirable to provide a method for time bounding notification delivery for a software component in an event driven system. It would be also desirable to provide a method for preventing the software component from waiting for notifications from other components for an unbounded time.

SUMMARY OF THE INVENTION

Accordingly, the present invention provides a method and system for preventing unnecessary delays during a notification delivery process in an event driven system.

In a first aspect of the present invention, a method for a time bound notification delivery that prevents unnecessary delays of a software component in an event driven system is provided. The software component may dispatch notifications (event handle requests) to all interested parties (listeners) in parallel. The interested parties are other components (applications) which are interested in receiving the notifications and perform specific actions in accordance with the event handle requests. Acknowledgments indicating that the requested event has been handled by the interested parties may be gathered during a time bound. However, after the time bound, termination requests may be sent to non-responding parties in order to prevent unnecessary delays. Additionally, non-responding parties may be removed from a list of listeners which have been registered as interesting parties for certain events detected by the software component in the event driven system.

In a second aspect of the present invention, an event driven system being capable of continuing its proceeding after a certain time bound is provided. The event drive system may comprise a software component such as notification broadcaster sending event handle requests to listeners. The listeners may be other components communicatively coupled to the notification broadcaster. The listeners may receive the event handle requests and send acknowledgments after performing operations in accordance with the handle requests. A termination request may be sent to listeners which have not sent acknowledgements in the time bound. In this manner, the software component may be guaranteed to continue its processing after the time bound. Additionally, an additional component such as a notification dispatcher may be utilized to relay event handling requests from software components to their listeners and to gather acknowledgments from the listeners after the time bound.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
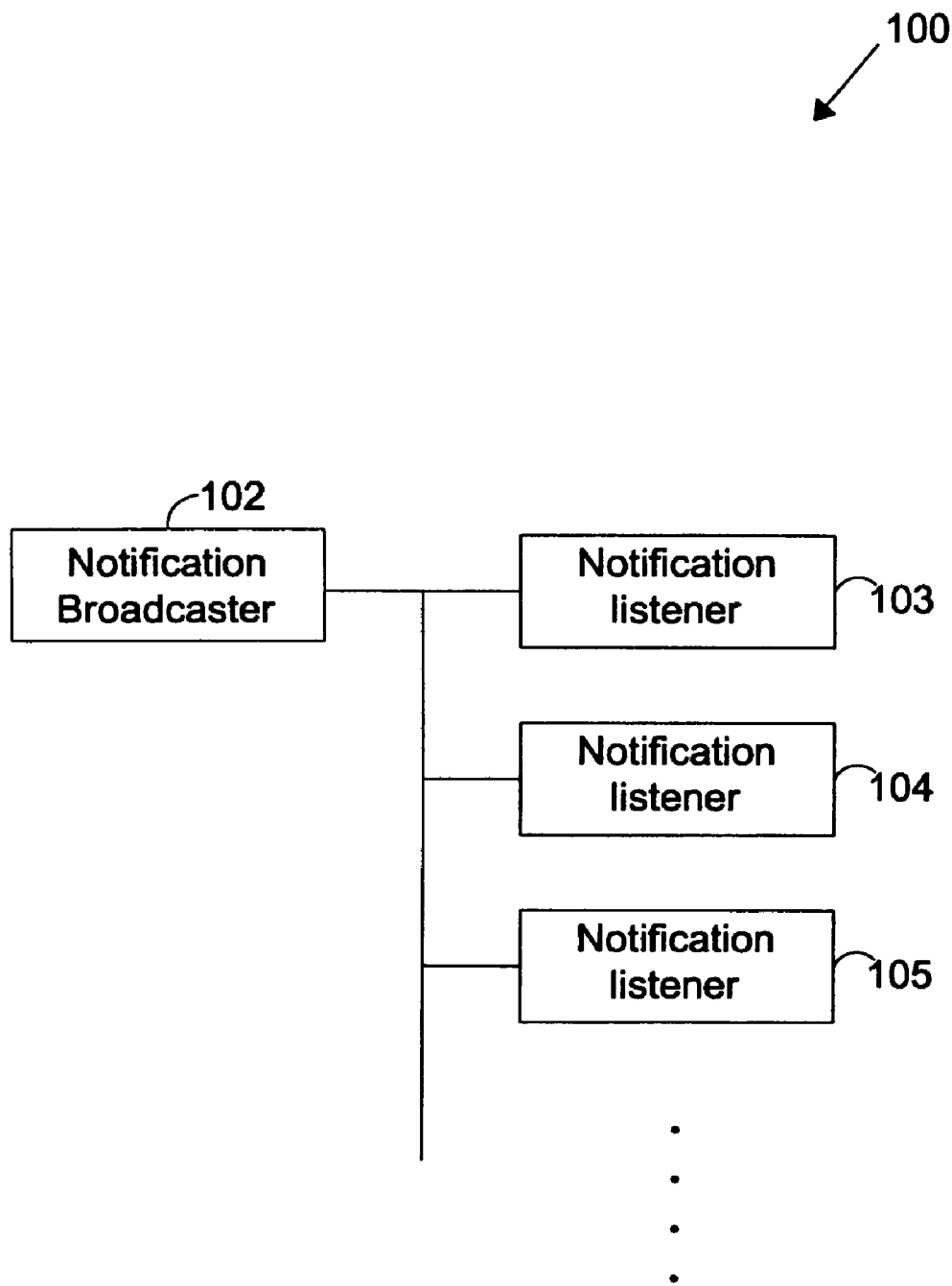
FIG. 1 is an illustration of a block diagram of a single notification configuration in accordance with an exemplary embodiment of the present invention.

Reference will now be made in detail to the presently preferred embodiments of the invention, examples of which are illustrated in the accompanying drawings.

The present invention is directed to a method and system for preventing unnecessary delays of a software component waiting for event completion acknowledgments in an event driven system. The software component may dispatch notifications (event handle requests) to all interested parties (listeners) in parallel. The interested parties are other components (applications) which are interested in receiving the notifications and perform specific actions in accordance with the event handle request. Acknowledgments indicating that the requested event has been handled by the interested parties may be gathered during a specific time bound. After the time bound, termination requests may be sent to non-responding parties in order to prevent unnecessary delays. Non-responding parties may cancel any actions related to the requested event upon reception of the termination request. Alternatively, non-responding parties may be removed from a list of listeners which have been registered as interesting parties for a software component in the event driven system. In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Referring generally now to FIGS. 1 through 5, exemplary embodiments of the present invention are shown.

Software systems, especially those that are distributed over a computer network, are often engineered by means of the integration of components (applications). An event driven architecture may be a good approach to support component-based software architectures. In the event driven architecture, the interaction of components is modeled with events. Components may emit events to inform other components of a change in their internal state or to request services from other components. Upon detecting the occurrence of events, components react by performing some actions and possibly emitting other events to other components. The glue that ties components together in an event driven architecture is an infrastructure called a notification delivery. The notification delivery also makes communications component-independent. One of the components registers the interests of other components and then dispatches event notifications accordingly. The other components invoke the requested event or perform some actions upon reception of the event notification. Since the notifications are broadcasted, the component which dispatches event notifications is often called a notification broadcaster. The components which wait for notifications of predefined events occurring are referred as listeners. In some cases, the notification broadcaster is also a listener of other predefined events. The listeners may send acknowledgements back to the notification broadcaster after they perform some actions. Since the notification broadcaster does not communicate with the listeners synchronously, the broadcaster may wait for the notifications from all of its listeners before it begins to move on to the next operation. In an embodiment of the present invention, the event notification may be terminated if the corresponding listener has not sent a completion acknowledgement back to the notification broadcaster in time. As such, the notification broadcaster may be guaranteed to continue its proceeding after a specific delay by terminating unanswered event notifications.

Referring now to FIG. 1, a block diagram of a single notification configuration in accordance with an exemplary embodiment of the present invention is shown. In an embodiment of the present invention, a notification broadcaster 102 may be coupled to many listeners (notifications listeners) 103-105 in an event driven system. The notification broadcaster 102 may be a software component (an application) designed to track listeners, provide a mechanism to add or remove listeners, and detect a triggering event. Upon detection of the triggering event, the notification broadcaster 102 may send event handling requests (notifications) to all the listeners in parallel. In a particular embodiment, a simple "scatter-gather" protocol may be utilized. The "scatter-gather protocol" dispatches notifications to all listeners for handling events and gather acknowledgements from the listeners after a specific time delay. With such a protocol, the listeners may not have to send notifications indicating that the event notification has arrived.

Listeners 103-105 are components (parties) which desire to receive notifications of the occurring of the triggering events. The listeners 103-105 may invoke the requested events upon reception of event notifications. For example, in a telecommunications network, one of the listeners may be an automated voicemail application which is responsible for playing a prerecorded message and recording an incoming message when an incoming telephone call is routed to voicemail. One of the listeners may be an automated e-mail application which records an incoming message in an electronic file and send the electronic file to an e-mail server. The notification broadcaster may be connected to a telephone line to detect a triggering event such as an incoming call. Upon a detection of the incoming call, the notification broadcaster sends an event handling request to the listeners to invoke the voicemail application and/or the e-mail application. The listener 103-105 may send an acknowledgement back to the notification broadcaster 102 when it completes the requested events. The notification broadcaster 102 may continue its processing after it receives the acknowledgement from the listener.

In an embodiment of the present invention, the notification broadcaster 102 may need to determine whether each notification has been handled by the listeners before performing other operations. In order to prevent an unwanted delay, the notification broadcaster 102 may cancel the event notifications (event handling requests) for a non-responding listener which does not respond in a specific time bound. Then, the notification broadcaster 102 may continue its processing. As such, the present invention may prevent an advertent notification cycle caused when the notification broadcaster is also a listener of other components. In a particular embodiment of the present invention, a list of listeners containing all registered listeners may be maintained in memory of the notification broadcaster. It will be appreciated that there are numerous ways to maintain and manipulate such a list. In an embodiment of the present invention, the notification broadcaster may remove the non-responding listener from its list of listeners. As a result, the notification broadcaster may not send event notifications to the non-responding listener for future triggering events.

Figure 2:
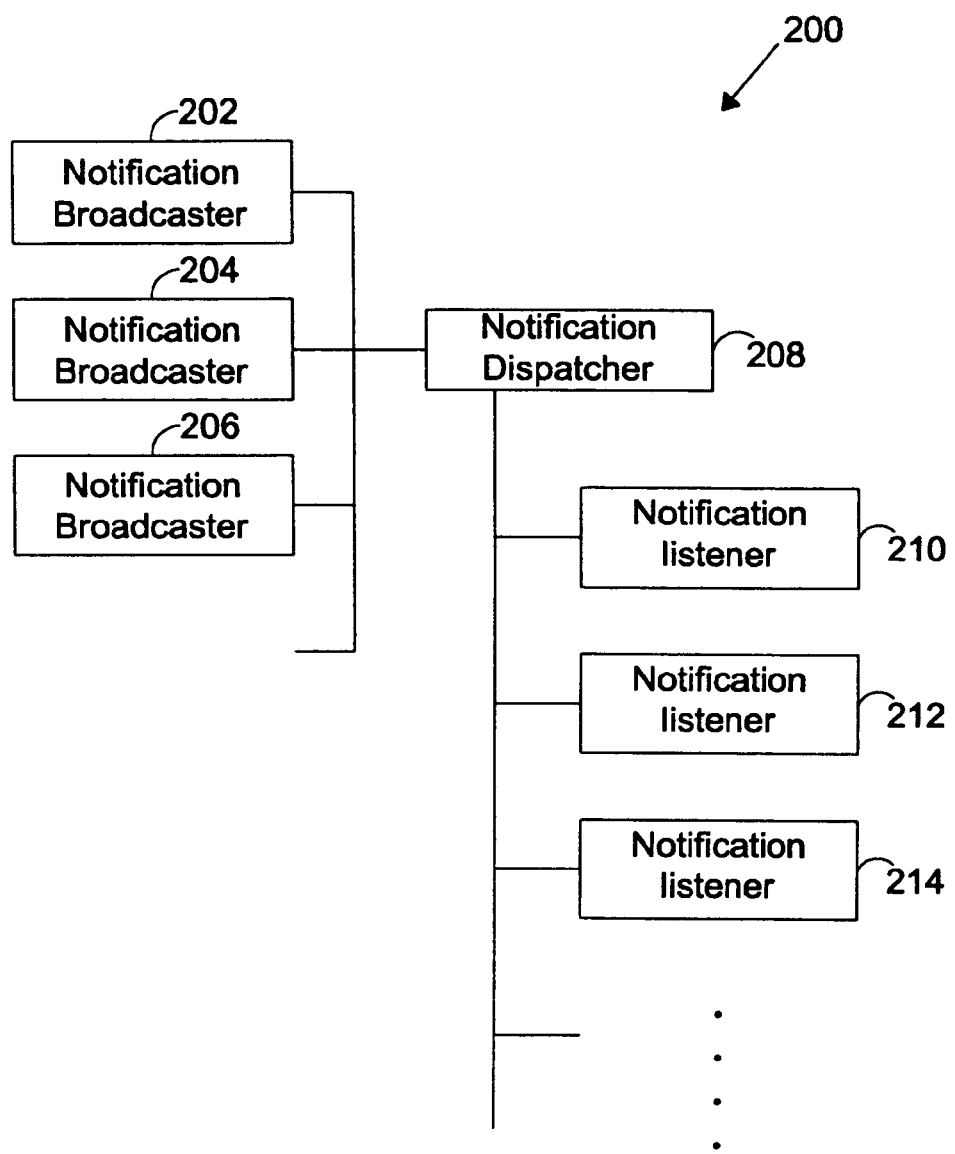
FIG. 2 is an illustration of a block diagram of a notification dispatcher configuration.

Referring now to FIG. 2, a block diagram 200 of a notification dispatcher configuration in accordance with an exemplary embodiment of the present invention is shown. In a particular embodiment of the present invention, the event driven system may comprise notification broadcasters 202-206 coupled to a notification dispatcher 208. The notification dispatcher 208 is a component which is in charge of sending event handle requests (notifications) which are originated from one of the notification broadcasters 202-206 to corresponding listeners 210-214. The corresponding listeners 210-214 include interesting components which desire to receive notifications of the occurrence of certain triggering events and may perform some actions in accordance with the event notifications. Each of the listeners 210-214 may send an acknowledgment indicating that the requested event has been completed. The notification dispatcher 208 is also in charge of gathering acknowledgements from the listeners and determining non-responding listeners. The notification dispatcher 208 will send a termination request to non-responding listeners after a time bound. In an embodiment of the present invention, the notification dispatcher may maintain a lookup table containing outstanding event requests. Thus, whenever the corresponding listener sends an acknowledgement, the outstanding event request for the listener may be removed from the lookup table. After the time bound, the notification dispatcher 208 may work though the lookup table to find non-responding listeners with outstanding event requests. The notification dispatcher 208 will send a termination request to each of the non-responding listeners and then remove the outstanding event request accordingly. Then, the notification dispatcher 208 may send an acknowledgement in order to return control back to a notification broadcaster 202-206 which originated the event handle request. The notification broadcaster 202-206 may continue its processing.

Figure 3:
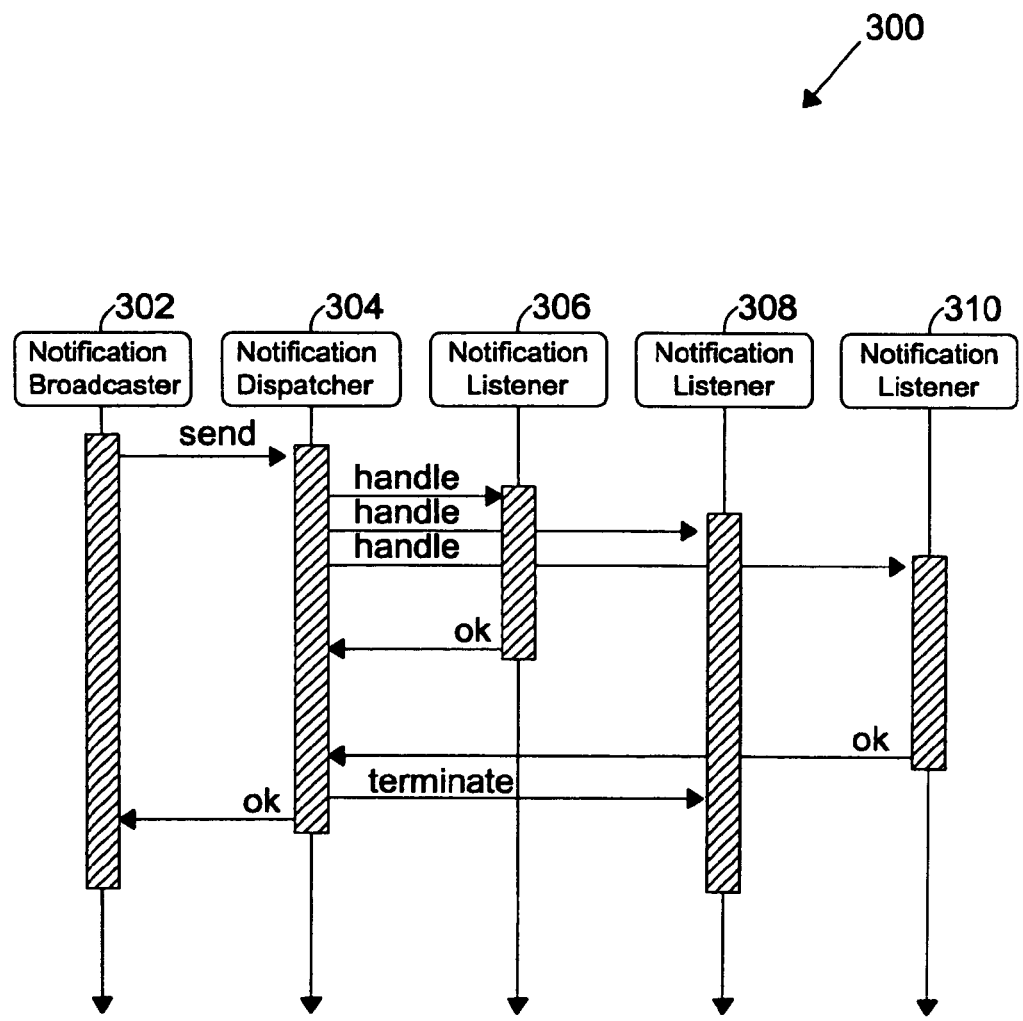
FIG. 3 is an illustration of an interaction diagram of a method implemented in the notification dispatcher configuration shown in FIG. 2.

Referring now to FIG. 3, an interaction diagram 300 illustrating a method implemented in the notification dispatcher configuration in FIG. 2 is shown. When a notification broadcaster 302 detects a triggering event, the notification broadcaster may send an event handling request to a notification dispatcher 304. Then, the notification dispatcher 304 may broadcast event handling requests to notification listeners 306-310 which have expressed their interest handling such events. The notification dispatcher 304 may gather acknowledgements from the listeners and determine non-responding listeners after a time bound. For example, in FIG. 3, notification listener 306 and 310 send acknowledgements indicating that the requested event has been invoked to the notification dispatcher 304. However, notification listener 308 has not responded in a time bound. The notification dispatcher sends a termination request to notification listener 308. Notification listener 308 may cancel invoking the requested event upon reception of the termination request. Now, all outstanding event handling requests may have been handled or terminated. Then, the notification dispatcher 304 may send an acknowledgement to the notification broadcaster 302 indicating all event requests have been handled. The notification broadcaster may continue its processing.

Figure 4:
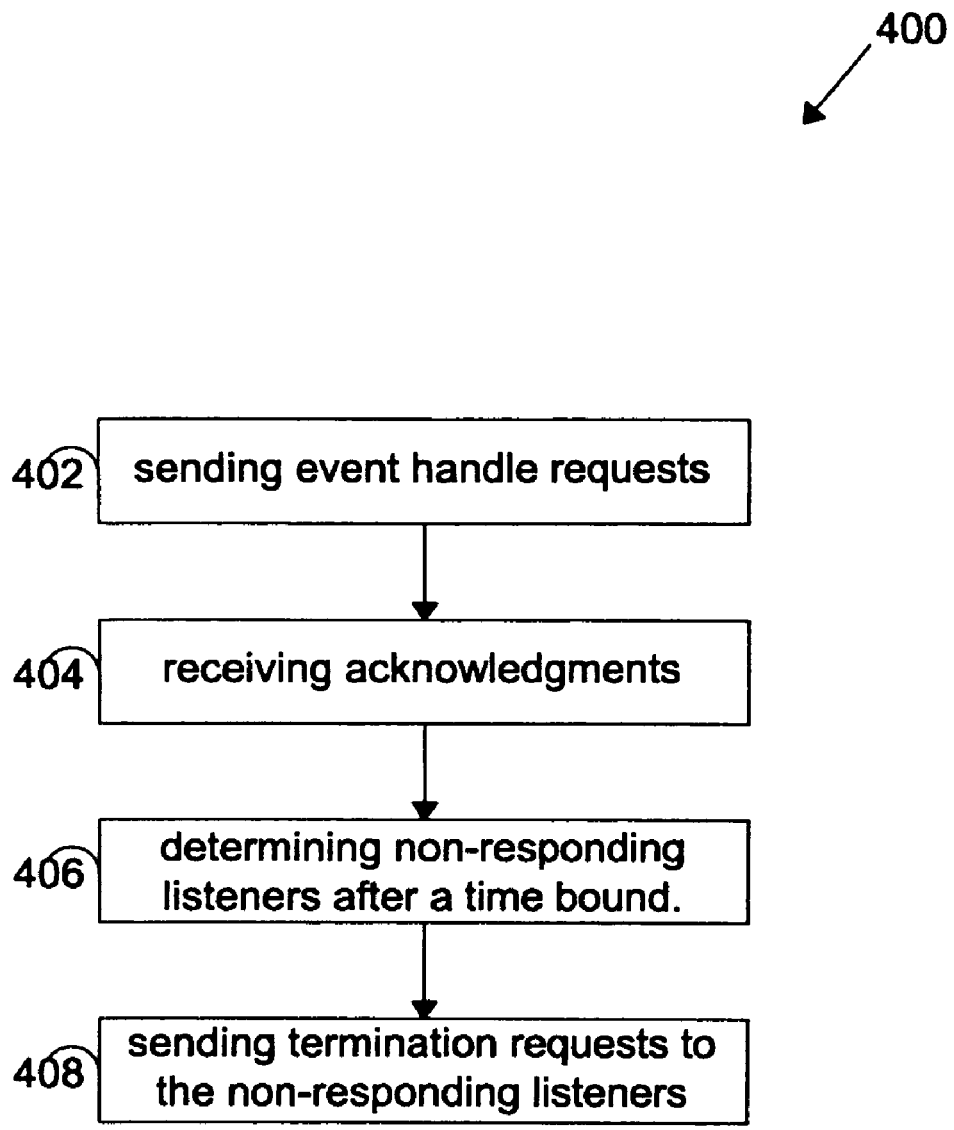
FIG. 4 is an illustration of a flow diagram of a method implemented in an exemplary embodiment of the present invention.

Referring now to FIG. 4, a flow diagram 400 of a method implemented in an embodiment of the present invention is shown. In step 402, a notification broadcaster in an event driven system may dispatch notifications to all interested parties (listeners) in parallel. In Step 404, the notification broadcaster may receive acknowledgments indicating that the requested event has been handled by listeners during a specific time bound. After the time bound, the notification broadcaster may determine which listener is a non-responding listener in Step 406. The non-responding listener may be a party which has not responded to the notification in the time bound. Then, termination requests may be sent to the non-responding party in order to prevent unnecessary delays in Step 408. The non-responding listener may cancel any actions related to the requested event upon reception of the termination request.

Figure 5:
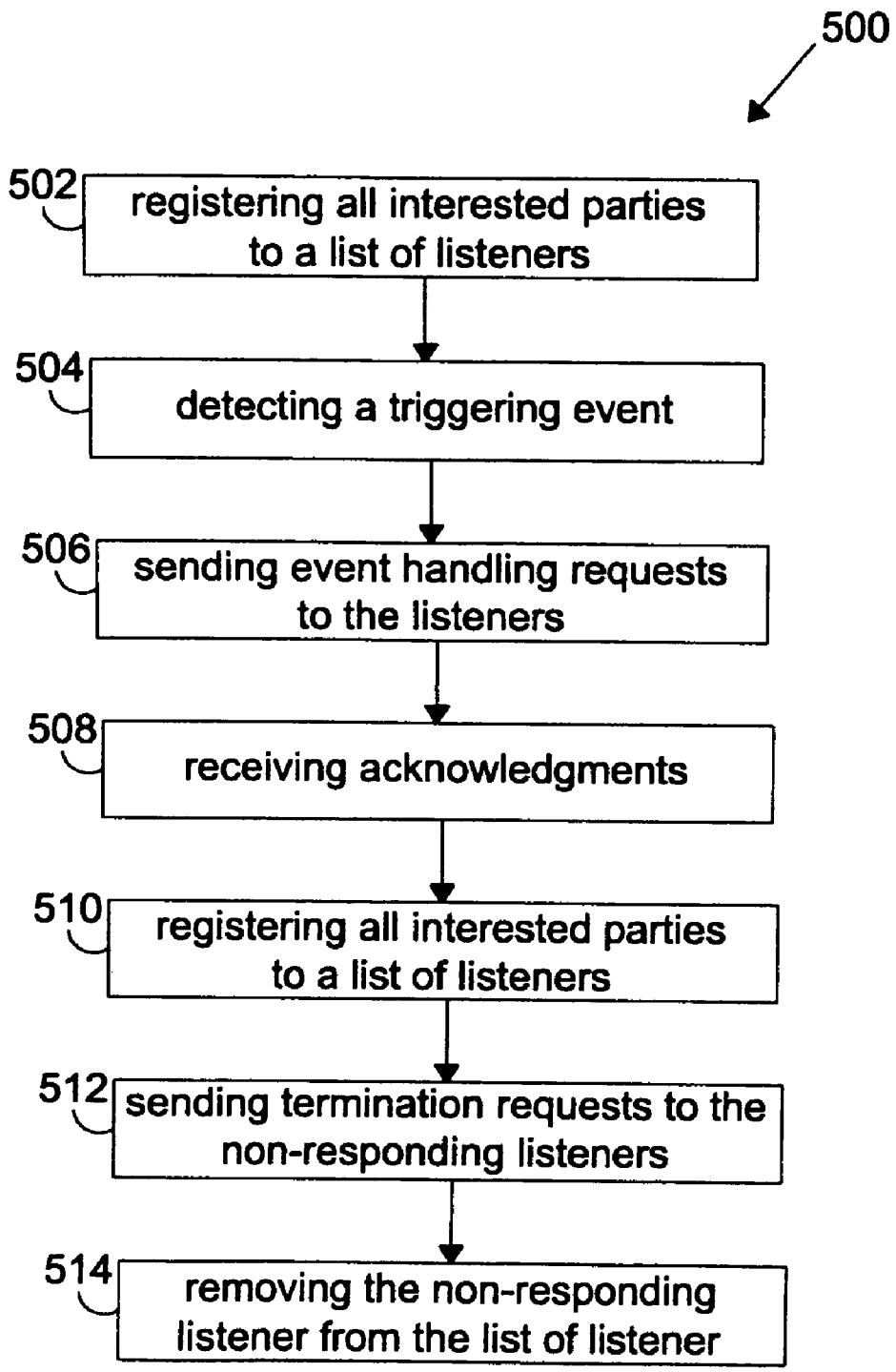
FIG. 5 is an illustration of a flow diagram of a method implemented in another exemplary embodiment of the present invention.

Referring now to FIG. 5, a flow diagram 500 a method implemented in another embodiment of the present invention is shown. In a particular embodiment of the present invention, a list of listeners containing all registered listeners may be maintained. It will be appreciated that there are numerous ways to maintain and manipulate such a list. In Step 502, the notification broadcaster may register all interested parties to the list of listeners. Listeners are components which are interested in receiving the notifications and perform specific actions in accordance with the event handle request from the notification broadcaster. In Step 504, the notification broadcaster may detect a triggering event. Then, the notification broadcaster may dispatch notifications to each of listeners from the list of listeners in parallel in Step 506. In Step 508, the notification broadcaster may receive acknowledgments indicating that the requested event has been handled by the interested parties during a specific time bound.

The notification broadcaster may determine non-responding listeners after the specific time bound in Step 510. Then, termination requests may be sent to the non-responding party in order to prevent unnecessary delays in Step 512. The non-responding listener may cancel any actions related to the requested event upon reception of the termination request. The responding listeners may be removed from the list of listeners in Step 514. As a result, the notification broadcaster may not send event notifications to the non-responding listener for future triggering events.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for time bounding notification delivery in an event driven system, comprising:
   sending an event handle request to each of a plurality of listeners in parallel, wherein each of the plurality of listeners is configured to perform an action related to the event handling request in response to receiving the event handling request and each of the plurality of listeners is registered as an interested party in a software component in the event driven system;
   determining whether an acknowledgement from each of the plurality of listeners has been received within a time bound, wherein each acknowledgment is a completion acknowledgement from a listener of the plurality of listeners when the listener accomplishes the action related to the event handle request;
   sending a terminate request to a non-responding listener from the plurality of listeners where the non-responding listener has not sent the completion acknowledgement in the time bound to prevent delay from waiting for each acknowledgment, wherein the non-responding listener cancels performance of the event handling request in response to receiving the terminate request, and
   cancelling the non-responding listener's registration as an interested party in the software component in the event driven system to prevent future event handling requests from being sent to the non-responding listener.

2. The method as described in claim 1, wherein the event handle request is sent whenever a triggering event is detected.

3. The method as described in claim 1, further comprising:
   determining whether any of the plurality of listeners has not sent the acknowledgement in the time bound.

4. The method as described in claim 1, further comprising:
   proceeding to a next operation,
   wherein each of the plurality of listeners has sent the acknowledgement or has received the termination request.

5. A method for preventing a software component from being blocked waiting for a notification in an event driven system, comprising:
   registering all interested parties to a list of listeners;
   detecting a triggering event;

in parallel, sending an event handle request to the listeners from the list of listeners upon detection of the triggering event wherein each of the listeners is configured to perform an action related to the event handling request in response to receiving the event handling request;

receiving an acknowledgement from one of the listeners, wherein the acknowledgment is a completion acknowledgment from the listener when the listener accomplishes the action related to the event handle request; and removing a non-responding listener from the list of listeners when the non-responding listener has not sent the completion acknowledgement in a time bound to prevent future event handle requests from being sent to the non-responding listener; and sending a termination request to the non-responding listener when the non-responding listener has not sent the completion acknowledgment in a time bound to prevent delay from waiting for the acknowledgment, wherein the non-responding listener cancels performance of the event handling request in response to receiving the termination request.

6. The method as described in claim 5, wherein the termination request cancels processing of the event handle request in the non-responding listener.

7. The method as described in claim 5, further comprising:
employing a dispatcher for sending notifications and gathering acknowledgements,
wherein the notifications include the event handle request, and the termination request.

8. The method as described in claim 5, further comprising:
continuing to perform a next operation after the time bound.

* * * * *